United States Patent
Heo et al.

(10) Patent No.: US 10,497,960 B2
(45) Date of Patent: Dec. 3, 2019

(54) SOLID OXIDE FUEL CELL AND CELL MODULE COMPRISING SAME

(71) Applicant: LG CHEM, LTD., Seoul (KR)

(72) Inventors: Yeonhyuk Heo, Daejeon (KR); Changseok Ryoo, Daejeon (KR); Kwangwook Choi, Daejeon (KR); Jongjin Lee, Daejeon (KR); Bu Won Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/578,987

(22) PCT Filed: Aug. 25, 2016

(86) PCT No.: PCT/KR2016/009417
§ 371 (c)(1),
(2) Date: Dec. 1, 2017

(87) PCT Pub. No.: WO2017/034336
PCT Pub. Date: Mar. 2, 2017

(65) Prior Publication Data
US 2018/0145362 A1 May 24, 2018

(30) Foreign Application Priority Data
Aug. 25, 2015 (KR) .................. 10-2015-0119760

(51) Int. Cl.
*H01M 8/04* (2016.01)
*H01M 8/1253* (2016.01)
*H01M 8/126* (2016.01)
*H01M 8/249* (2016.01)
*H01M 8/124* (2016.01)

(52) U.S. Cl.
CPC ......... *H01M 8/1253* (2013.01); *H01M 8/126* (2013.01); *H01M 8/249* (2013.01); *H01M 2008/1293* (2013.01); *H01M 2300/0094* (2013.01)

(58) Field of Classification Search
CPC ........................................ H01M 8/04
See application file for complete search history.

(56) References Cited

U.S. PATENT DOCUMENTS

| | | | |
|---|---|---|---|
| 2009/0214919 A1* | 8/2009 | Suzuki | H01M 8/004 429/469 |
| 2011/0076594 A1 | 3/2011 | Fan et al. | |
| 2011/0236794 A1 | 9/2011 | Donet et al. | |

(Continued)

FOREIGN PATENT DOCUMENTS

| KR | 10-2003-0045324 A | 6/2003 |
|---|---|---|
| KR | 10-0886239 B1 | 2/2009 |
| KR | 10-2012-0010507 A | 2/2012 |

(Continued)

OTHER PUBLICATIONS

Park et al. ("Fabrication of Large area thin-film solid oxide fuel cells" CIRP Annals vol. 63 Iss. 1, 2014, pp. 513-516).*

(Continued)

*Primary Examiner* — Jacob B Marks
(74) *Attorney, Agent, or Firm* — Birch, Stewart, Kolasch & Birch, LLP

(57) ABSTRACT

The present specification relates to a solid oxide fuel cell and a cell module including the same.

4 Claims, 5 Drawing Sheets

(56) References Cited

U.S. PATENT DOCUMENTS

2012/0021339 A1    1/2012  Ryu et al.

FOREIGN PATENT DOCUMENTS

KR    10-2012-0074724 A    7/2012
KR    10-2013-0055939 A    5/2013

OTHER PUBLICATIONS

Chang et al., "Ultrathin YSZ Coating on Pt Cathode for High Thermal Stability and Enhanced Oxygen Reduction Reaction Activity", Advanced Energy Materials, Mar. 10, 2015, vol. 5, No. 10, pp. 1-7; See abstract; p. 1, left column, line 1-p. 2, right column, line 31: p. 6, left column, lines 24-26; and figure 3a.
Horita et al., "Ceria-Zirconia Composite Electrolyte for Solid Oxide Fuel Cells", Journal of Electroceramics, 1997, vol. 1, No. 2, pp. 155-164, See abstract; and p. 164, left column, lines 1-8.
International Search Report, issued in PCT/KR2016/009417 (PCT/ISA/210), dated Nov. 29, 2016.
Chan et al., "A simple bilayer electrolyte model for solid oxide fuel cells," Solid State Ionics, vol. 158, 2003, pp. 29-43.
Eguchi et al., "Electrical properties of ceria-based oxides and their application to solid oxide fuel cells," Solid State Ionics, vol. 52, 1992, pp. 165-172.
Extended European Search Report for European Application No. 16839624.0, dated Jan. 16, 2019.

\* cited by examiner

【FIG. 1】
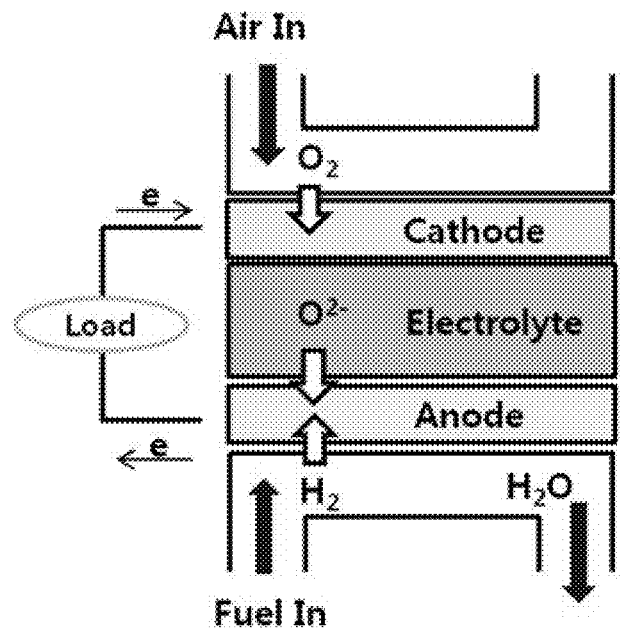
【FIG. 2】
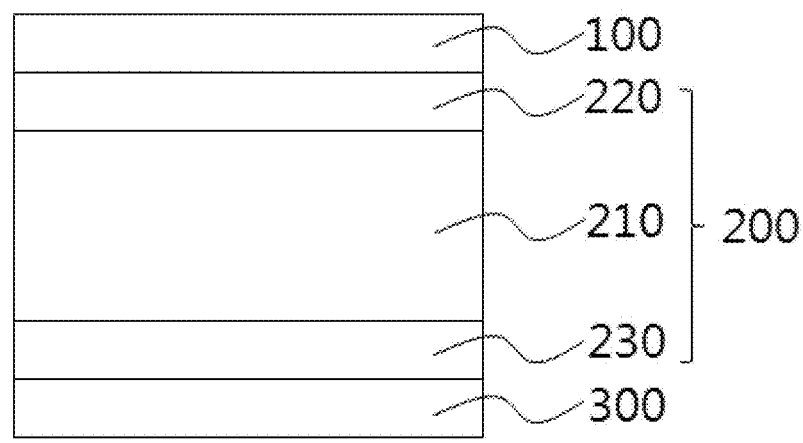

[FIG. 3]
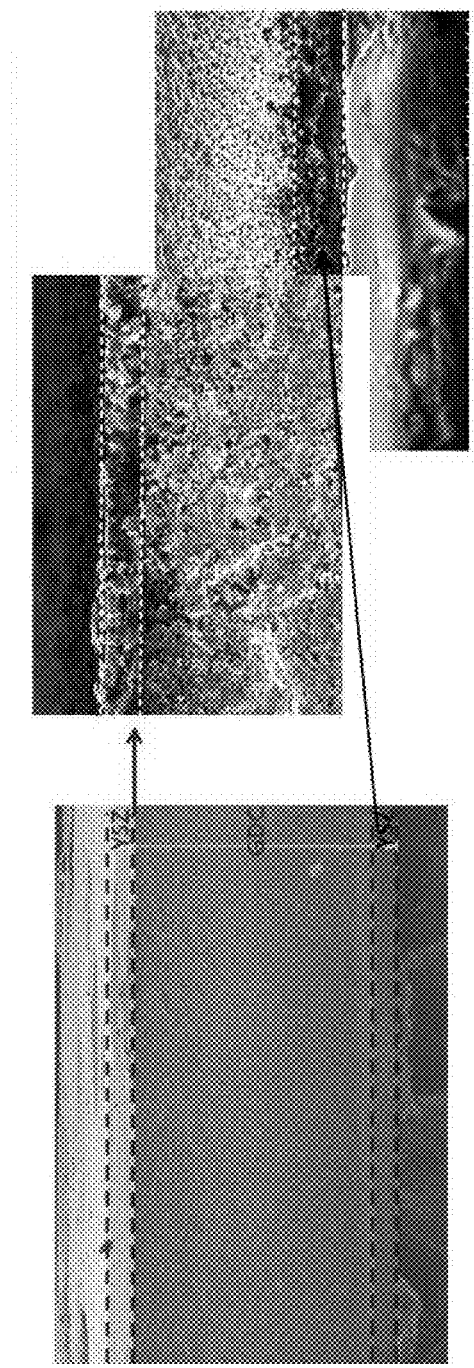

[FIG. 4]
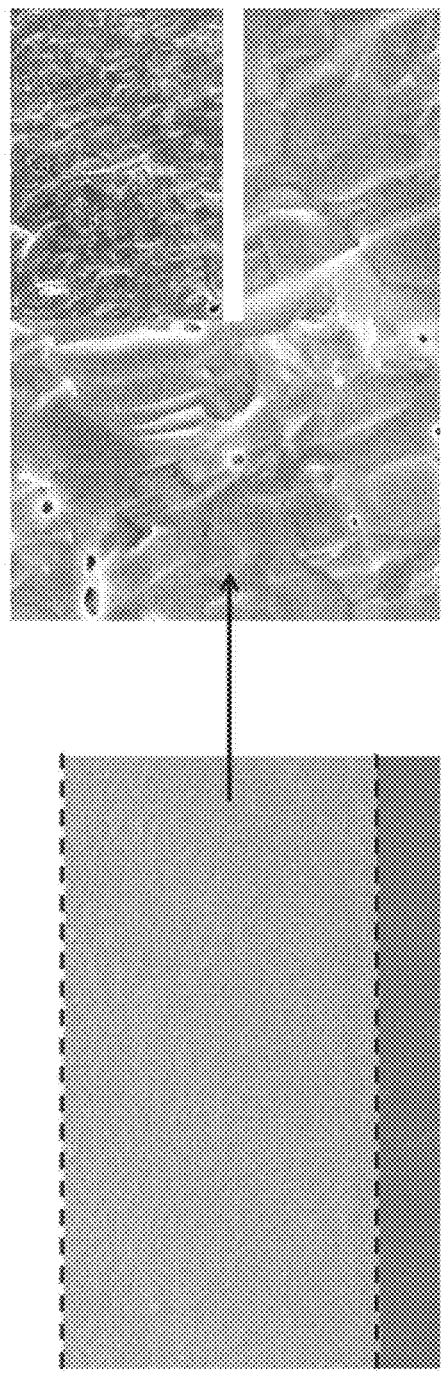

【FIG. 5】
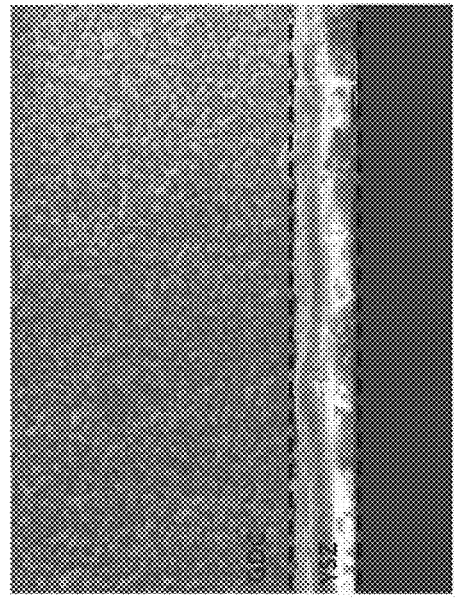
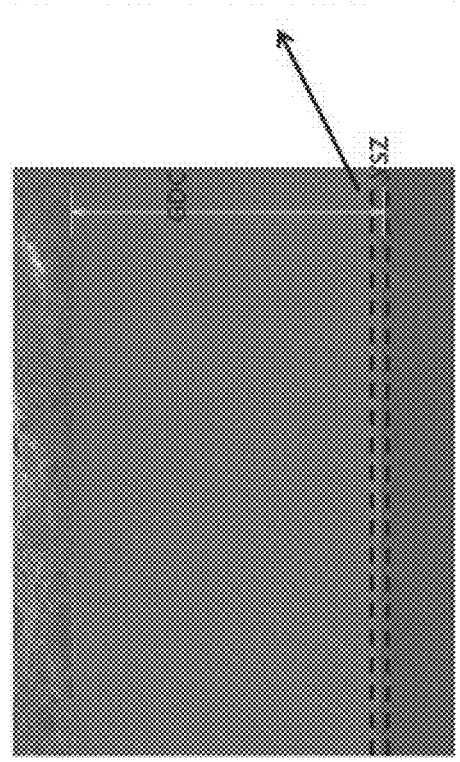

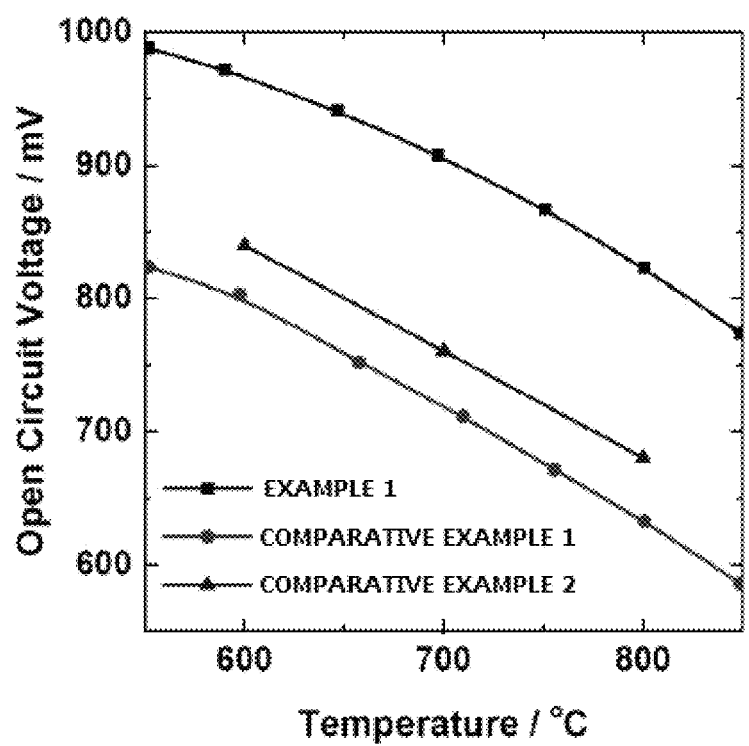
[FIG. 6]

SOLID OXIDE FUEL CELL AND CELL MODULE COMPRISING SAME

TECHNICAL FIELD

This application claims priority to and the benefits of Korean Patent Application No. 10-2015-0119760, filed with the Korean Intellectual Property Office on Aug. 25, 2015, the entire contents of which are incorporated herein by reference.

The present specification relates to a solid oxide fuel cell and a cell module including the same.

BACKGROUND ART

With recent predictions about the exhaustion of existing energy resources such as petroleum and coal, interests in alternative energy capable of replacing these have been growing. As one of such alternative energy, fuel cells have received particular attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

FIG. 1 is a diagram schematically showing a principle of electricity generation of a solid oxide-type fuel cell, and the solid oxide-type fuel cell is formed with an electrolyte layer, and a fuel electrode (anode) and an air electrode (cathode) formed on both surfaces of this electrolyte layer. When referring to FIG. 1 showing a principle of electricity generation of a solid oxide-type fuel cell, air is electrochemically reduced in an air electrode to produce oxygen ions, and the produced oxygen ions are transferred to a fuel electrode through an electrolyte layer. In the fuel electrode, fuel such as hydrogen, methanol and butane is injected, and the fuel releases electrons while bonding to the oxygen ions and electrochemically oxidized to produce water. Through such a reaction, electrons migrate to an external circuit.

DISCLOSURE

Technical Problem

The present specification is directed to providing a solid oxide fuel cell and a cell module including the same.

Technical Solution

One embodiment of the present specification provides an electrolyte support-type solid oxide fuel cell including a fuel electrode, an electrolyte support and an air electrode provided in a consecutive order, wherein the electrolyte support includes a gadolinium-doped ceria-based electrolyte layer and a yttria-stabilized zirconia-based electrolyte layer each provided on both surfaces of the gadolinium-doped ceria-based electrolyte layer.

Another embodiment of the present specification provides a cell module including the solid oxide fuel cell as a unit cell.

Advantageous Effects

A solid oxide fuel cell according to one embodiment of the present specification has an advantage of high chemical stability.

A solid oxide fuel cell according to one embodiment of the present specification has an advantage of high open circuit voltage.

An electrolyte layer of a solid oxide fuel cell according to one embodiment of the present specification has high ion conductivity.

A solid oxide fuel cell according to one embodiment of the present specification has high driving efficiency and favorable long-term stability.

DESCRIPTION OF DRAWINGS

FIG. 1 is a schematic diagram showing a principle of electricity generation of a solid oxide fuel cell (SOFC).

FIG. 2 is a structural diagram of a vertical section of a solid oxide fuel cell according to one embodiment of the present specification.

FIG. 3 is a SEM image of Example 1.

FIG. 4 is a SEM image of Comparative Example 1.

FIG. 5 is a SEM image of Comparative Example 2.

FIG. 6 is a graph measuring an open circuit voltage (OCV) of Example 1 and Comparative Examples 1 and 2.

REFERENCE NUMERAL

100: Fuel Electrode
200: Electrolyte Layer
210: Gadolinium-Doped Ceria-Based Electrolyte Layer
220: Yttria-Stabilized Zirconia-Based First Electrolyte Layer
230: Yttria-Stabilized Zirconia-Based Second Electrolyte Layer
300: Air Electrode

MODE FOR DISCLOSURE

Hereinafter, the present specification will be described in detail.

One embodiment of the present specification provides a solid oxide fuel cell including a fuel electrode, an electrolyte layer and an air electrode provided in a consecutive order.

The solid oxide fuel cell is preferably an electrolyte support-type solid oxide fuel cell including an electrolyte layer support having a relatively thicker electrolyte layer compared to other layers.

The fuel electrode may include an oxygen ion conducting first inorganic substance, and in the fuel electrode, the oxygen ion conducting first inorganic substance is present in a crystalline state with the oxygen ion conducting first inorganic substance particles being sintered, and the fuel electrode may be porous having pores so as to inject fuel and discharge produced water.

The first inorganic substance is not particularly limited as long as it has oxygen ion conductivity, however, the first inorganic substance may include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium-doped ceria (SDC: $(Sm_2O_3)x(CeO_2)_{1-x}$, x=0.02 to 0.4), gadolinium-doped ceria (GDC: $(Gd_2O_3)x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The fuel electrode may include the same inorganic substance as the electrolyte layer, and specifically, the first inorganic substance of the fuel electrode may include at least one of yttria-stabilized zirconia (YSZ: $(Y_2O_3)_x(ZrO_2)_{1-x}$, x=0.05 to 0.15) and gadolinium-doped ceria (GDC: $(Gd_2O_3)_x(CeO_2)_{1-x}$, x=0.02 to 0.4).

The fuel electrode may further include NiO.

The fuel electrode may be prepared by sintering a green sheet prepared with fuel electrode slurry, or may be prepared by directly coating fuel electrode slurry, and then drying and sintering the result. Herein, the green sheet means, instead of a complete final product, a membrane in a film form processible in a next step. In other words, the green sheet is obtained by coating with a coating composition including inorganic substance particles and a solvent and drying the result to a sheet form, and the green sheet refers to a sheet in a semi-dried state capable of maintaining a sheet form while including some quantity of solvent.

The fuel electrode slurry includes the first inorganic substance particles, and may further include a binder resin, a plasticizer, a dispersant and a solvent. The binder resin, the plasticizer, the dispersant and the solvent are not particularly limited, and common materials known in the art may be used.

The fuel electrode may have a thickness of greater than or equal to 10 μm and less than or equal to 100 μm. Specifically, the fuel electrode may have a thickness of greater than or equal to 20 μm and less than or equal to 50 μm.

The fuel electrode may have porosity of greater than or equal to 20% and less than or equal to 60%. Specifically, the fuel electrode may have porosity of greater than or equal to 30% and less than or equal to 50%.

The fuel electrode may have pore diameters of greater than or equal to 0.1 μm and less than or equal to 10 μm. Specifically, the fuel electrode may have pore diameters of greater than or equal to 0.5 μm and less than or equal to 5 μm. More specifically, the fuel electrode may have pore diameters of greater than or equal to 0.5 μm and less than or equal to 2 μm.

The electrolyte layer may be an electrolyte layer support that is relatively thicker compared to other layers, and the electrolyte layer may be a multilayer electrolyte layer formed with a multilayer of three or more layers.

The electrolyte layer may include a gadolinium-doped ceria-based electrolyte layer and a yttria-stabilized zirconia-based electrolyte layer each provided on both surfaces of the gadolinium-doped ceria-based electrolyte layer. Specifically, the electrolyte layer may include a gadolinium-doped ceria-based electrolyte layer, a yttria-stabilized zirconia-based first electrolyte layer provided on one surface of the gadolinium-doped ceria-based electrolyte layer, and a yttria-stabilized zirconia-based second electrolyte layer provided on the other surface of the gadolinium-doped ceria-based electrolyte layer.

The electrolyte layer may consist of a gadolinium-doped ceria-based electrolyte layer and a yttria-stabilized zirconia-based electrolyte layer each provided on both surfaces of the gadolinium-doped ceria-based electrolyte layer. Specifically, the electrolyte layer may consist of a gadolinium-doped ceria-based electrolyte layer, a yttria-stabilized zirconia-based first electrolyte layer provided on one surface of the gadolinium-doped ceria-based electrolyte layer, and a yttria-stabilized zirconia-based second electrolyte layer provided on the other surface of the gadolinium-doped ceria-based electrolyte layer.

The gadolinium-doped ceria-based electrolyte layer has high oxygen ion conductivity but has low chemical stability, and open circuit voltage characteristics are not favorable. As a result, cell efficiency decreases and long-term stability is not favorable.

The yttria-stabilized zirconia-based electrolyte layer has high chemical stability but has low oxygen ion conductivity.

In one embodiment of the present specification, the thickness of the electrolyte layer increases when the electrolyte layer is used as a support, which increases resistance of the electrolyte layer. Therefore, while using a gadolinium-doped ceria-based electrolyte layer having high oxygen ion conductivity as a main electrolyte layer, relatively thin yttria-stabilized zirconia-based electrolyte layer is formed on both surfaces of the gadolinium-doped ceria-based electrolyte layer to compensate chemical stability of the gadolinium-doped ceria-based electrolyte layer.

A thickness ratio of the gadolinium-doped ceria-based electrolyte layer: the one yttria-stabilized zirconia-based electrolyte layer may be greater than or equal to 1:0.001 and less than or equal to 1:0.1. Specifically, a thickness ratio of the gadolinium-doped ceria-based electrolyte layer: the one yttria-stabilized zirconia-based electrolyte layer may be greater than or equal to 1:0.005 and less than or equal to 1:0.05.

A ratio of the thickness of the gadolinium-doped ceria-based electrolyte layer: the total thickness of the yttria-stabilized zirconia-based electrolyte layers may be greater than or equal to 1:0.002 and less than or equal to 1:0.2. Specifically, a ratio of the thickness of the gadolinium-doped ceria-based electrolyte layer: the total thickness of the yttria-stabilized zirconia-based electrolyte layers may be greater than or equal to 1:0.01 and less than or equal to 1:0.1.

The gadolinium-doped ceria-based electrolyte layer may include $(Gd_2O_3)_x(CeO_2)_{1-x}$ (x=0.02 to 0.4).

The gadolinium-doped ceria-based electrolyte layer may have a thickness of greater than or equal to 500 μm and less than or equal to 1000 μm, and this is advantageous in that ion conductivity and mechanical strength of a fuel cell are proper. The thickness being less than 500 μm makes it difficult to physically support a fuel cell, and when the thickness is greater than 1000 μm, resistance increases making it difficult to accomplish battery cell performance.

Specifically, the gadolinium-doped ceria-based electrolyte layer may have a thickness of greater than or equal to 500 μm and less than or equal to 700 μm, and the gadolinium-doped ceria-based electrolyte layer may have a thickness of greater than or equal to 550 μm and less than or equal to 650 μm.

The yttria-stabilized zirconia-based electrolyte layers may each include $(Y_2O_3)_x(ZrO_2)_{1-x}$ (x=0.05 to 0.15). Specifically, the yttria-stabilized zirconia-based first electrolyte layer and the yttria-stabilized zirconia-based second electrolyte layer may include the same or different yttria-stabilized zirconia.

The yttria-stabilized zirconia-based electrolyte layers may each have a thickness of greater than or equal to 5 μm and less than or equal to 20 μm. This is advantageous in that chemical stability of the gadolinium-doped ceria-based electrolyte layer is compensated while maintaining ion conductivity of the electrolyte layer.

Specifically, the yttria-stabilized zirconia-based electrolyte layers may each have a thickness of greater than or equal to 5 μm and less than or equal to 10 μm.

The air electrode may include an oxygen ion conducting second inorganic substance, and in the air electrode, the oxygen ion conducting second inorganic substance is present in a crystalline state with the oxygen ion conducting second inorganic substance particles being sintered, and the air electrode may be porous having pores so as to inject air.

The second inorganic substance is not particularly limited as long as it has oxygen ion conductivity, however, the second inorganic substance may include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium-doped ceria (SDC: $(Sm_2O_3)x(CeO_2)_{1-x}$, x=0.02 to 0.4), gadolinium-doped ceria (GDC: $(Gd_2O_3)x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The air electrode may be prepared by sintering a green sheet prepared with air electrode slurry, or prepared by directly coating fuel electrode slurry, and then drying and sintering the result.

The air electrode slurry includes the second inorganic substance particles, and may further include a binder resin, a plasticizer, a dispersant and a solvent. The binder resin, the plasticizer, the dispersant and the solvent are not particularly limited, and common materials known in the art may be used.

The air electrode may have a thickness of greater than or equal to 10 μm and less than or equal to 100 μm. Specifically, the air electrode may have a thickness of greater than or equal to 20 μm and less than or equal to 50 μm.

The air electrode may have porosity of greater than or equal to 20% and less than or equal to 60%. Specifically, the air electrode may have porosity of greater than or equal to 30% and less than or equal to 50%.

The air electrode may have pore diameters of greater than or equal to 0.1 μm and less than or equal to 10 μm. Specifically, the air electrode may have pore diameters of greater than or equal to 0.5 μm and less than or equal to 5 μm. More specifically, the air electrode may have pore diameters of greater than or equal to 0.5 μm and less than or equal to 2 μm.

Another embodiment of the present specification provides a cell module including the solid oxide fuel cell as a unit cell.

The cell module may include a stack including a unit cell including the solid oxide fuel cell and a separator provided between the unit cells; a fuel supply unit supplying fuel to the stack; and an oxidizer supply unit supplying an oxidizer to the stack.

The cell module may specifically be used as a power supply of electric vehicles, hybrid electric vehicles, plug-in hybrid electric vehicles or power storage devices.

Hereinafter, the present specification will be described in more detail with reference to examples. However, the following examples are for illustrative purposes only, and the scope of the present specification is not limited thereto.

EXAMPLE

Example 1

1. Preparation of GDC Electrolyte Support 1 g of GDC powder (Rhodia, ULSA) was placed in a mold with a 15 mm diameter, and was uniaxial pressurized with 5 ton for 90 seconds to prepare a pellet, and the pellet was sintered for 3 hours at 1500° C. to prepare a GDC electrolyte support having a thickness of approximately 600 μm.

2. Preparation of Auxiliary Electrolyte Slurry

Auxiliary electrolyte slurry was prepared by mixing, based on the total weight of the auxiliary electrolyte slurry, 50 weight % of YSZ, 10 weight % of a dispersant, 0.5 weight % of a plasticizer and 10 weight % of an acryl-based binder with a residual quantity of solvent (29.5 weight %).

3. Preparation and Lamination (Coating) of Auxiliary Electrolyte Tape

The prepared auxiliary electrolyte slurry was coated using a doctor blade to prepare a green sheet. The green sheet was laminated on both surfaces of the GDC electrolyte support sintered in a pellet form using a laminator, and the result was sintered for 3 hours at 1350° C. A final sample having a YSZ auxiliary electrolyte layer having a thickness of approximately 7 μm provided on both surfaces of the GDC electrolyte support was prepared.

[Comparative Example 1]

Preparation was carried out in the same manner as in Example 1 except that a final sample was prepared using only the GDC electrolyte support of Example 1 without the auxiliary electrolyte.

[Comparative Example 2]

Preparation was carried out in the same manner as in Example 1 except that a final sample was prepared by forming a single auxiliary electrolyte layer having a thickness of approximately 7 μm only on the fuel electrode side of the GDC electrolyte support of Example 1.

[Experimental Example 1]

Vertical sections of Example 1 and Comparative Examples 1 and 2 were observed using a scanning electron microscope (SEM), and each image is shown in FIG. 3 to FIG. 5.

[Experimental Example 2]

A platinum mesh was formed using a platinum paste, and an electrode was formed on both surfaces of the sample by sintering the platinum mesh for 2 hours at 1000° C. In order to check an open circuit voltage (OCV), a voltage difference was measured while injecting hydrogen on one side, and air on the other side.

For Example 1 and Comparative Examples 1 and 2, the open circuit voltage (OCV) was measured depending on temperatures, and the results are shown in FIG. 6.

The sample using the auxiliary electrolyte (YSZ) on both surfaces [Example 1] had enhanced chemical stability and exhibited a high OCV compared to the electrolyte support (GDC) without the auxiliary electrolyte [Comparative Example 1]. In the sample using the auxiliary electrolyte on only one surface in the fuel electrode direction [Comparative Example 2], a slightly increased OCV was obtained, however, the sample was not stabilized as the sample using the auxiliary electrolyte on both surfaces.

The invention claimed is:

1. An electrolyte support-type solid oxide fuel cell comprising:
   a fuel electrode;
   an electrolyte support; and
   an air electrode provided in a consecutive order, wherein the electrolyte support includes a gadolinium-doped ceria-based electrolyte layer and a yttria-stabilized zirconia-based electrolyte layer each provided on both surfaces of the gadolinium-doped ceria-based electrolyte layer, wherein the yttria-stabilized zirconia-based electrolyte layers each have a thickness of 5 μm or more and 20 μm or less, wherein the gadolinium-doped ceria-based electrolyte layer has a thickness of 500 μm or more and 1000 μm or less, and wherein a thickness ratio of the gadolinium-doped ceria-based electrolyte layer: the one yttria-stabilized zirconia-based electrolyte layer is 1: 0.001 or more and 1: 0.1 or less.

2. The electrolyte support-type solid oxide fuel cell of claim 1, wherein the gadolinium-doped ceria-based electrolyte layer includes $(Gd_2O_3)_x(CeO_2)_{1-x}$ (x=0.02 to 0.4).

3. The electrolyte support-type solid oxide fuel cell of claim 1, wherein the yttria-stabilized zirconia-based electrolyte layers each include $(Y_2O_3)_x(ZrO_2)_{1-x}$ (x=0.05 to 0.15).

4. A cell module comprising the solid oxide fuel cell of claim 1 as a unit cell.

* * * * *